(12) United States Patent
Moritani et al.

(10) Patent No.: US 7,873,767 B2
(45) Date of Patent: Jan. 18, 2011

(54) WIRELESS IC MEMORY, ACCESSING APPARATUS FOR USE OF WIRELESS IC MEMORY, ACCESSING CONTROL METHOD FOR USE OF WIRELESS IC MEMORY, AND WIRELESS IC MEMORY SYSTEM

(75) Inventors: Masumi Moritani, Yokohama (JP); Shinichiro Fukushima, Yokohama (JP); Hiroyuki Higaki, Yokohama (JP); Yuichi Kobayashi, Yokohama (JP); Atsushi Honzawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 11/893,000

(22) Filed: Aug. 29, 2007

(65) Prior Publication Data
US 2008/0059659 A1    Mar. 6, 2008

(30) Foreign Application Priority Data
Aug. 29, 2006    (JP) .............................. 2006-231615

(51) Int. Cl.
*G06F 13/12* (2006.01)
(52) U.S. Cl. ........................................ 710/74
(58) Field of Classification Search ............... 710/74
See application file for complete search history.

(56) References Cited

U.S. PATENT DOCUMENTS 6,933,848 B1 *    8/2005    Stewart et al. ........... 340/572.3

OTHER PUBLICATIONS

"Information technology-Radio frequency identification for item management-Part 6: Parameters for air interface communications at 860 MHz to 960 MHZ," ISO/IEC 18000-6:2004, International Standard, Aug. 15, 2004 (downloaded from http://iso.org/iso/en/CatalogueDetailPage?CSNUMBER=43923>>).

* cited by examiner

*Primary Examiner*—Henry W Tsai
*Assistant Examiner*—Juanito C Borromeo
(74) *Attorney, Agent, or Firm*—McDermott Will & Emery LLP

(57) ABSTRACT

A wireless IC memory, for improving the security thereof, for achieving protection of business information and privacy, comprises an RFID tag 100, wherein it is possible to setup "readout disenabling (ReadLock)" condition to the UII code bank for storing ID data of the RFID tag 100, with a predetermined protocol from an external communication apparatus, within the RFID tag 100. Setup of "readout disenabling (ReadLock)" condition is stored on a readout enabling/disenabling condition memory portion 105 within the RFID tag 100. In case where the "readout disenabling (ReadLock)" condition is set up in the UII code bank, a protocol process controller portion 103 of the RFID tag 100, not responding the UII code, normally, but answers a fake UII code or an error code, or gives no answer, to a request or command of readout of the UII data from the external communication apparatus.

20 Claims, 9 Drawing Sheets

FIG.4

| RFID STATE \ READOUT ENABLING/DISENABLING CONDITION | READOUT ENABLING | READOUT DISENABLING (ReadLock) | PERMANENT READOUT DISENABLING (Permanent ReadLock) |
|---|---|---|---|
| Reply STATE | ○ | × | × |
| Acknowledge STATE | ○ | × | × |
| Open STATE | ○ | × | × |
| Secured STATE | ○ | ○ | × |

| | 110 | 111 | 112 |
|---|---|---|---|
| 203 | PC BIT | UII CODE | CRC-16 |

A — 113

B — 114: READOUT ENABLING CONDITION — | 0C00$_h$ | 0123···4567$_h$ | ABCD$_h$ |

C — 115: READOUT DISENABLING (ReadLock) CONDITION — | 0C00$_h$ | 0000···0000$_h$ | ABCD$_h$ |

D — 116: READOUT DISENABLING (ReadLock) CONDITION — | 0C00$_h$ | FFFF···FFFF$_h$ | ABCD$_h$ |

E — 117: READOUT DISENABLING (ReadLock) CONDITION — | 0C00$_h$ | F0F0···F0F0$_h$ | ABCD$_h$ |

F — 118: READOUT DISENABLING (ReadLock) CONDITION — | 0C00$_h$ | ReadLock FLAG + ···0000$_h$ | ABCD$_h$ |

G — READOUT DISENABLING (ReadLock) CONDITION — | 0000$_h$ | 0000···0000$_h$ | 0000$_h$ |

FIG.11

| RFID STATE \ READOUT ENABLING/DISENABLING CONDITION | READOUT ENABLING | READOUT DISENABLING (ReadLock) | PERMANENT READOUT DISENABLING (Permanent ReadLock) |
|---|---|---|---|
| 119 Ready STATE | O | × | × |
| 120 Arbitrate STATE | O | × | × |
| 121 Reply STATE | O | × | × |
| 122 Acknowledge STATE | O | × | × |
| 123 Open STATE | O | × | × |
| 124 Secured STATE | O | O | × |

FIG.12

WIRELESS IC MEMORY, ACCESSING APPARATUS FOR USE OF WIRELESS IC MEMORY, ACCESSING CONTROL METHOD FOR USE OF WIRELESS IC MEMORY, AND WIRELESS IC MEMORY SYSTEM

BACKGROUND OF THE INVENTION

1. Field of the Invention

The present invention relates to a technology for a wireless IC memory, such as, a RFID (Radio Frequency Identification) tag, representatively, and also an accessing control method for the wireless IC memory.

2. Related Art

As a representative one of the wireless IC memories for enabling data communication between an external apparatus through radio waves is already known the RFID tag. The RFID tag is already developed or spread into traceability service for management of distribution history and/or trace information of articles, mainly in the distribution industry or business. A standard, i.e., ISO 18000-6 Type C, is determined as a specification of the RFID tag for global use thereof. According to said standard, a data memory portion within the RFID tag is defined into four (4) areas, i.e., a user area bank, a tag code bank, a UII code bank and a security bank, wherein a readout request or command for the data of each of banks is transmitted to the RFID tag, and said RFID tag answers or responds the data within the corresponding bank.

[Non-Patent Document] ISO/IEC 18000-6:2004 Information technology-Radio frequency identification for item management-Part 6: Parameters for air interface communications at 860 MHz to 960 MHz

SUMMARY OF THE INVENTION

However, the data of every bank is so designed that it responds, unconditionally, to the readout command from the external apparatus, in a mechanism thereof; therefore, there is a problem in the security thereof. For example, in a way of use for the traceability, for example, in particular, on the process of distributing the articles attached with the RFID tags thereon, the information of the UII code bank, storing therein a unique ID data of the RFID tag, i.e., the UII (Unique Item Identifier) code, can be read out, easily, for everybody, by using an external communication apparatus. In this manner, it cannot said that the function is sufficient for protection of business information and/or privacy, etc., only with the fact of following the standard or regulation.

An object, according to the present invention, for dissolving those, is to provide a wireless IC memory improved in security thereof.

According to a one aspect of the present invention, for accomplishing the object mentioned above, there is provided a wireless IC memory, for transmitting command or data between an external communication apparatus, with using radio-wave communication, comprising: an antenna, which is configured to transmit radio-waves carrying a signal with said external communication apparatus; a communication processor portion, which is configured to conduct transmission control of said signal; one or more of memory bank(s), which is/are configured to memorize data therein, including an ID bank, which is configured to memorize ID data of being unique to said wireless IC memory; a protocol processing controller portion, which is configured to conduct transmission process of command or data that said signal presents, management of states of said wireless IC memory on protocol, or control of data readout for each of said memory banks; and a condition memory portion, which is configured to set up an enabling/disenabling condition of data readout of said ID data bank, wherein said protocol processing controller portion has: a condition setup portion, which is configured to set up one condition, being selected from at least first and second conditions, in said condition memory portion, as the enabling/disenabling condition of data readout of said ID data bank; and an access control portion, which is configured to respond said ID data, normally, to a readout command of said ID data from said external communication apparatus, when said first condition is set up in said condition memory portion, but not respond said ID data, normally, to the readout command of said ID data from said external communication apparatus, when said second condition is set up in said condition memory portion.

Within this wireless IC memory, according to the present invention, it is possible to set up a specific condition for regulating the readout of data, in relation to the ID data bank for storing the ID data unique to this wireless IC memory, in advance, with an aid of a command protocol predetermined. In case where such the condition is set up in advance, this wireless IC memory operates, but not responding the ID data, normally, to the readout request or command of the ID data from the external communication apparatus.

Within this wireless IC memory, according to the present invention, said protocol processing controller portion may have further a state management portion, which is configured to transit the state of said wireless IC memory on the protocol, among a predetermined number of states. And, said access control portion may respond, differently, to the readout request or command of the ID data from said external communication apparatus, depending on the combination between said readout enabling/disenabling condition in relation to said ID data bank, which is set up in said readout enabling/disenabling condition memory portion, and the state of said wireless IC memory on the protocol. With this, it is possible to achieve more complex access control.

According to the preferable embodiment, said condition setup portion sets up one condition, which is selected among first, second and third conditions, as said readout enabling/disenabling condition in relation to said ID data bank, and also said state management portion transits the state of said wireless IC memory on the protocol, sequentially, in an order of "Replay" state, "Acknowledge" state, "Open" state and "Secured" state, respectively. And, said access control portion responds said ID data, normally, to the readout command of said ID data from said external communication apparatus, in case where said first condition is set up in said condition memory portion, irrespective of any one of the states of said wireless IC memory on the protocol, but though responding said ID data, normally, to the readout command of said ID data from said external communication apparatus, only when the state of said wireless IC memory on the protocol is the "Secured" state, it does not respond, normally, when it is the state other than said "Secured" state, in case where said second condition is set up in said condition memory portion, and further, it does not respond, normally, to the readout command of said ID data from said external communication apparatus, irrespective of any one of the states of said wireless IC memory on the protocol, in case where said third condition is set up in said condition memory portion.

Also, according to the present invention, as more detailed embodiments of the action, i.e., not responding the ID data, normally, to the readout request or command of ID data from the external communication apparatus, within this wireless IC memory, various kinds of variations can be applied therein. One of the those variations is a method of responding a fake ID data, normally, which is same in data length to said ID data but different in data values thereof. Or, it is also possible to responds the fake ID data, normally, which replaces data of whole data length of said ID data by "0". Or, alternately, it is possible to respond the fake ID data, normally, which replaces data of whole data length of said ID data by data of a specific pattern predetermined. Or, it is also possible to the fake ID data, normally, combining data indicative of said second condition or said third condition, and data of a specific pattern predetermined. Responding the fake ID data in this manner, since it seems for the external communication apparatus, that the ID data is answered, normally, from the wireless IC memory, responding to the readout request or command of ID data, it is possible for the external communication apparatus to proceed the communication with the wireless IC memory on the protocol in accordance with the regulation. Therefore, it is possible to enjoy the advantages or merits of the IC memory, according to the present invention, if applying a normal apparatus in accordance with the regulation, as the external communication apparatus.

Also, as other embodiment of not responding the ID data, normally, it is also possible to respond a predetermined error code or make no response. Or, alternately, not only making such a response as was mentioned above, but it is also possible to respond the fake data of the specific pattern, in relation to a protocol control bit or an error detection value, which is memorized in the ID data bank other than the ID data.

According to a second aspect of the present invention, there is also provided a wireless IC memory, for transmitting command or data between an external communication apparatus, with using radio-wave communication, comprising: an antenna, which is configured to transmit radio-waves carrying a signal with said external communication apparatus; a communication processor portion, which is configured to conduct transmission control of said signal; one or more of memory bank(s), which is/are configured to memorize data therein, including an ID bank, which is configured to memorize ID data of being unique to said wireless IC memory; a protocol processing controller portion, which is configured to conduct transmission process of command or data that said signal presents, management of states of said wireless IC memory on protocol, or control of data readout for each of said memory banks; and a condition memory portion, which is configured to set up an enabling/disenabling condition of data readout of said ID data bank, wherein said protocol processing controller portion has:

a condition setup portion, which is configured to set up one condition, being selected from at least first and second conditions, in said condition memory portion, as the enabling/disenabling condition of data readout of said ID data bank; and an access control portion, which is configured to execute an action requested by said selection command, normally, where said first condition is set up in said condition memory portion, about the memory banks in relation to said selection condition, but neglects said selection command, or determines inconsistency with said selection condition, or not execute the action requested by said selection command, where said second condition is set up in said condition memory portion, about the memory banks in relation to said selection condition, in case when receiving the selection command having a selection condition in relation to any of the memory banks, from said external communication apparatus.

With this wireless IC memory, it is possible to set up a specific condition for regulating the readout of data for each of the memory banks, with an aid of a predetermined command protocol, in advance. If setting up the specific condition in relation to a certain memory bank, it is possible to bring the wireless IC memory not to operate, normally, responding a selection command, in case when receiving the command of selecting that wireless command having a specific attribute in relation to that memory bank, and when that specific attribute corresponds to that.

Further, within the other preferred embodiments, said condition setup portion sets up one condition, which is selected among first, second and third conditions, as said readout enabling/disenabling condition in relation to said ID data bank, and said state management portion transits the state of said wireless IC memory on the protocol, sequentially, in an order of "Replay" state, "Acknowledge" state, "Open" state and "Secured" state, respectively.

And, said access control portion executes the action, normally, which is requested by said selection, in case where said first condition is set up in said condition memory portion, irrespective of any one of the states of said wireless IC memory on the protocol, only when the state of said wireless IC memory on the protocol is the "Secured" state, and though executing the action, normally, which is requested by said selection, only when the state of said wireless IC memory on the protocol is the "Secured" state, but it does not execute the action, normally, which is requested by said selection, when it is the state other than said "Secured" state, in case where said second condition is set up in said condition memory portion, and further it does not execute the action, normally, which is requested by said selection, irrespective of any one of the states of said wireless IC memory on the protocol, in case where said third condition is set up in said condition memory portion.

According to the present invention, it is possible to provide a wireless IC memory of being improved in security thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DESCRIPTION OF THE PREFERRED EMBODIMENTS

Hereinafter, embodiments according to the present invention will be fully explained by referring to the attached drawings.

The present invention is applicable to various kinds of wireless IC memories, including an RFID tag, but herein after, explanation will be made on several embodiments, according to the present invention, as a non-restrictive illustration thereof.

The RFID tag, according to a first embodiment of the present invention will be explained, by referring to FIGS. 1, 2, 3, 4, 5, 6, 7, 8, 9 and 10.

Figure 1:
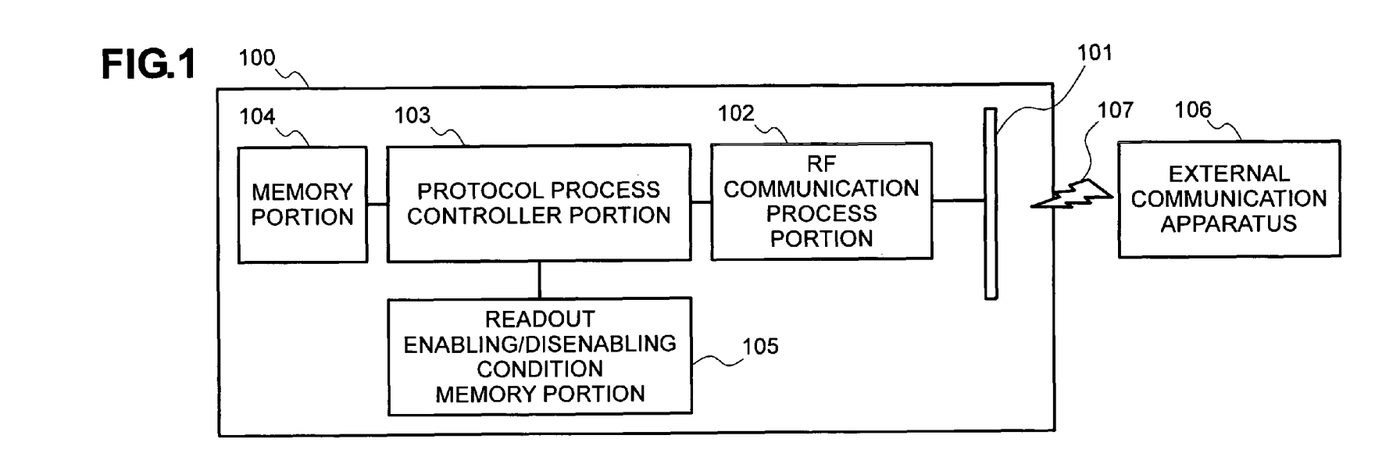
FIG. 1 is a system view of an RFID tag, according to a first embodiment of the present invention.

FIG. 1 is the structural view of the RFID tag, according to the present embodiment.

The RFID tag 100, enabling to communicate with an external communication apparatus 106, by using wireless radio wave 107, is constructed with an antenna 101 for conducting transmission of the wireless radio wave 107 carrying a signal thereon, an RF communication processor portion 102 for conducting transmission control of the signal mentioned above, a protocol process controller portion 103 for conducting a process of transmission of commands and/or data, which are indicated by the signal mentioned above, and/or management of an internal state, a memory portion 104 having one or more memory banks for memorizing data therein, and a readout enabling/disenabling condition memory portion 105 for memorizing a readout enabling/disenabling condition of the data stored in the memory bank, for each of the memory banks within the memory portion 104. Herein, as an example of the external communication apparatus, there may be listed a reader/writer apparatus for use of RFID tag, etc.

Figure 2:
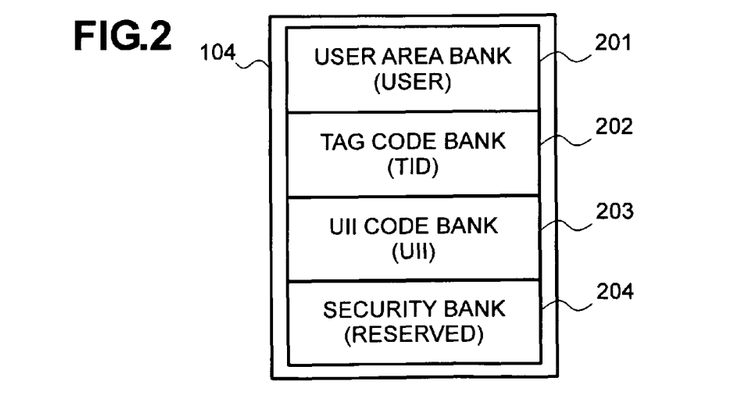
FIG. 2 is the structural view of a memory portion of the RFID tag, according to the first embodiment of the present invention.

FIG. 2 is the structural view of the memory portion 104 shown in FIG. 1.

The memory portion 104 is constructed with a user area bank 201, for a user to store arbitrary data therein, a tag code bank 202, for a tag producer to store arbitrary data therein, a UII code bank 203, for storing data therein, including unique ID data of the FRID tag, i.e., UII (Unique Item Identifier) code, and a security bank 204, including passwords therein, such as, a kill command password or the like, necessary for "kill" setup for brining the RFID tag to be inoperable.

Figure 3:
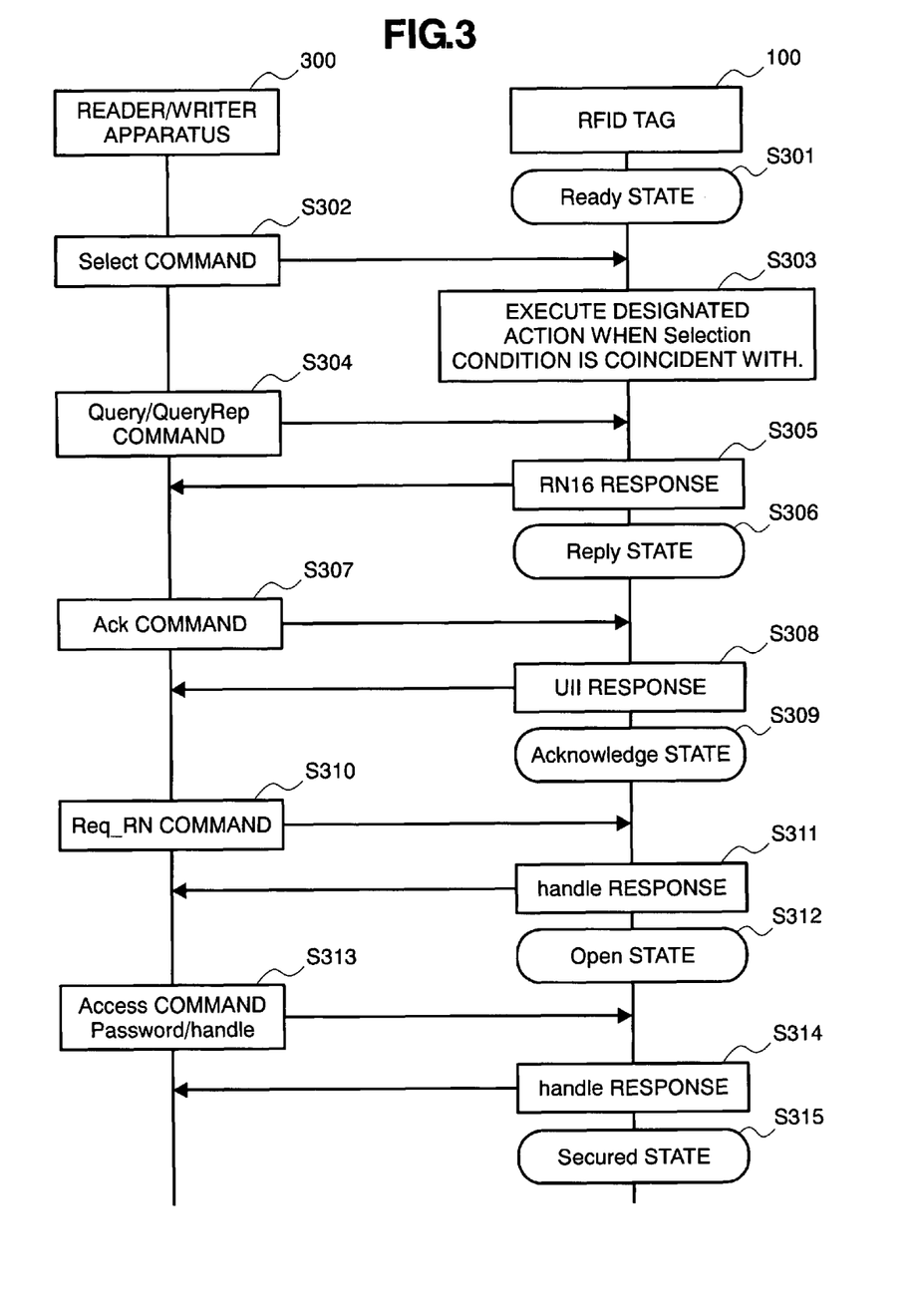
FIG. 3 is an operation flowchart of the RFID tag, according to the first embodiment of the present invention.
Figure 4:
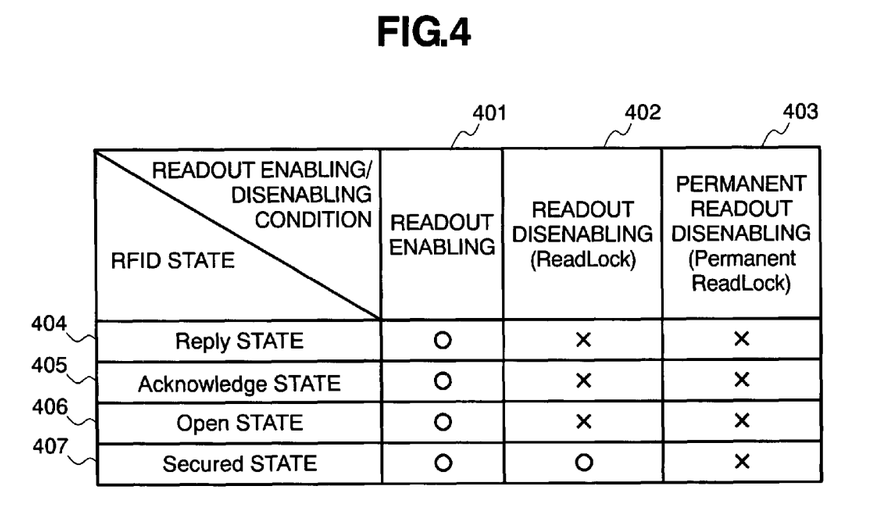
FIG. 4 is a table for showing the states of the RFID tag, and different operations corresponding thereto, in combination with condition of enabling/disenabling readout of a UII code bank.

FIG. 3 is a flowchart, in particular, when the reader/writer apparatus reads out the UII code of the RFID tag, according to the present invention, and also shows state transition on a protocol of the RFID tag, at the same time. FIG. 4 is a table for showing a relationship between a plural number of states, in relation to enabling/disenabling of readout of data in the UII code bank 203 within the memory portion 104 of the FRID tag according to the present invention, and responses thereto; i.e., whether the RFID tag should normally respond the UII code ("○" in the figure) or not ("X" in the figure), responding to the readout command of the UII code from the external communication apparatus 106, such as, the reader/writer apparatus, in accordance with the combination of the states on the protocol of the RFID tag. FIGS. 5-9 are flowcharts when the RFID tag, according to the present embodiment, responds the UII code to the command of the external communication apparatus 106. FIG. 10 shows an example of the answer of the UII code when "readout disenabling (ReadLock) condition" is set up for the UII code bank 203.

Hereinafter, by referring to those figures, explanation will be made on the functions and operations of the RFID tag, according to the present embodiment. Although, not only the reader/writer apparatus 300 for use of RFID tag, but also other equipments than that may be applied, as the external communication apparatus 106, however explanation will be made herein, by referring to an example of the case where the external communication apparatus 106 is the reader/writer apparatus 300 for use of RFID tag, herein.

As is shown in FIG. 4, states on the protocol of the RFID tag 100 (herein after, being called "RFID state", generally) includes "Replay" state, "Acknowledge" state, "Open" state, and "Secured" state. The protocol processor portion 103 manages (or memorizes) the present RFID state, and also controls the transition thereof.

Also, as the conditions in relation to readout enabling/disenabling of data from the plural number of memory banks 201-204 (see FIG. 2) within the RFID tag 100 (herein after, being called "readout enabling/disabling condition", generally), there are "readout enabling", "readout disenabling (ReadLock)" and "permanent readout disenabling (Permanent ReadLock)". For each of the memory banks, any one of those readout enabling/disabling conditions can be set up in the RFID tag 100 through a predetermined command sequence. Thus, when the setup is made on the readout enabling/disabling condition through the predetermined command sequence, setup data (for example, flag information) of the readout enabling/disabling condition is stored into the readout enabling/disabling condition memory portion 105, under the control of the protocol process controller portion 103.

Hereinafter, the more details thereof will be given.

First of all, explanation will be made on a flow, in particular, when the "readout enabling" conditions are set up for every memory banks of the RFID tag 100, and when the RFID tag 100 responds the UII code, normally, and further responds, normally, to the data readout command of the user area bank 201, etc., responding to the command from the reader/writer 300, by referring to FIGS. 1, 2 and 3.

By referring to FIG. 3, firstly, upon receipt of radio wave 107 from the reader/writer 300 on the antenna 101, the RFID tag 100 stars up, and the protocol process controller portion 103 operates to transit into "Ready" state through the RF communication processor portion 102 (step S301). Next, for the purpose of selecting a RFID tag having a specific attribute, the reader/writer 300 transmits a Select command to the RFID tag 100, including a Select condition, which designates that specific attribute (step S302). Upon receipt of the Select command through the antenna 101 and the RF communication processor portion 102, the protocol process controller portion 103 confirms the "readout enabling" condition is set up also for every one of the memory banks 201-204 by referring to the readout enabling/disabling condition memory portion 105, and then executes an action designated in case when the attribute of the RFID tag 100 agree or be coincident with the Select condition (step S303). The Select condition, in more details thereof, for example, is such that, for example, "a RFID tag, which are coincident with "0xFFFF" in the lower 4 digits of the UII code of" or the like, and the action designated is such that, for example, "set up the state of any one of the flags, which the FRID tag has, into the state, '1'" or the like.

Next, the reader/writer 300 transmits a Query command to the RFID tag (step S304). In the Query command are included a number of information, being equal to the number of slots (i.e., a slot number) necessary for congestion control of RFID tags, and then the protocol process controller portion 103 receiving the Query command through the RF communication processor portion 102 sets up arbitrary numeric value, being equal or less than that slot number, to be a slot counter value. And then, the reader/writer 300 transmits a QueryRep command to the RFID tag 100, sequentially, while decrementing that slot number. The protocol process controller portion 103 of the RFID tag 100 responds NR16 to the QueryRep command of the slot counter value or the Query command, corresponding thereto (step S305), and transits into the "Reply" state (step S306).

Next, when receiving the NR16 mentioned above, the reader/writer 300 transmits Ack command (step S307). On the contrary to this, the protocol process controller portion 103 responds the UII code when confirming that every memory banks 201-204 are in the condition of "readout enabling" by referring to the readout enabling/disabling condition memory portion 105 (step S308), and transits into the "Acknowledge" state (step S309). Up to the steps mentioned above, the flow of responding the UII code is ended.

In case when further necessity an accessing process, such as, reading out data in the user area bank 201 or writing data, for example, then the reader/writer 300 transmits a Req_RN command, following to the above (step S310). The RFID tag 100 responds a handle (step S311), and transits into the "Open" state (step S312). The RFID tag 100 conducts a predetermined operation, responding to a Read command or a Write command, when it is in the "Open" state.

Next, when trying to transit the RFID tag 100 into the "Secured" state, the reader/writer 300 transmits an Access command (step S313). That Access command includes a Password and a handle therein, and the protocol process controller portion 103 of the RFID tag 100 responds the handle, again, in case when the said handle is coincident with the password, which is stored in the security bank 204, and also when that handle is coincident with the handle, which is responded in the step S311 (step S312), and transits into the "Secured" state. The RFID tag under the "Secured" state is able to conduct operations, such as, transiting into the state of not operating even upon receipt of a kill command, including a correct password (i.e., a killed state), etc.

FIG. 4 shows relationships, i.e., the RFID tag 100 should answer the UII code, normally or not, responding to the Ack command from the reader/writer apparatus 300, depending on the combination between the readout enabling/disenabling condition in relation to the UII code bank 203; i.e., the "readout enabling" condition 401, the "readout disenabling (ReadLock)" condition 402 or the "permanent readout disenabling (Permanent Readlock)" condition 403, and the RFID state transmittable, i.e., the "Reply" state 404, the "Acknowledge" state 405, the "Open" state 406 or the "Secured" state 407. The case of normally responding is indicated by "◯" in the figure, and the case of not normally responding by "X" in the figure.

When the "readout enabling" condition 401 is set up in relation to the UII code bank 203, then the RFID tag 100 can reads out the UII code, normally, even when it is in anyone of the states. When the "readout disenabling (ReadLock)" condition 402 is set up in relation to the UII code bank 203, although the RFID tag 100 can read out the UII code, normally, only when it is in the "secured" state, but it cannot readout the UII code, normally, under the states other than that. Also, when the "permanent readout disenabling (Permanent Readlock)" condition 403 is set up in relation to the UII code bank 203, the RFID tag 100 can read out the UII code, normally, in any state (even in the "secured" state).

An operation of responding the UII code, normally, upon receipt of the Ack command, in case when combining the "readout enabling" condition 401 and the "Reply" state 404, corresponds to that of the step S308 shown in above-mentioned FIG. 3. The combination between the "readout enabling" condition 401 and the "Acknowledge" state 405 corresponds to the step S309 in FIG. 3, but in this state, the tag responds the UII code, normally, in case when receiving the Ack command. The combination between the "readout enabling" condition 401 and the "Open" state 406 corresponds to the step S312 in FIG. 3, and also the combination between the "readout enabling" condition 401 and the "Secured" state 407 to the step S315 in FIG. 3, but in any case, the tag responds the UII code, normally, in case when receiving the Ack command under that state.

Figure 5:
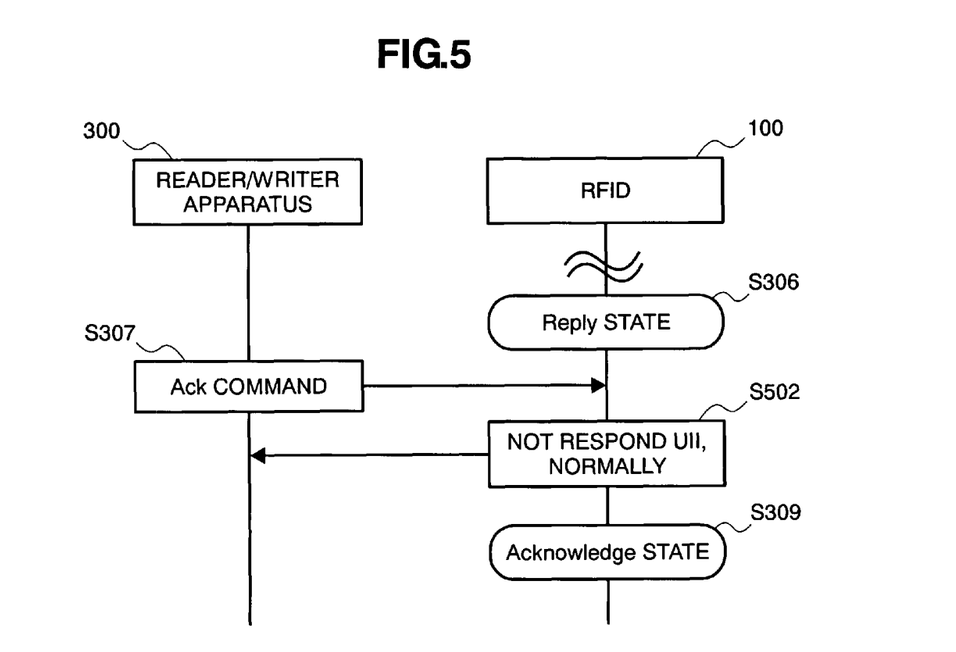
FIG. 5 is an operation flowchart of the RFID tag, according to the first embodiment, in particular, when combining "readout disenabling" or "permanent readout disenabling" condition of the UII code bank and "Replay" state of the RFID tag.

FIG. 5 is a flowchart for showing the operation when combining the "readout disenabling (ReadLock)" condition 402 or the "permanent readout disenabling (Permanent Readlock)" condition 403, in relation to the UII code bank 203 shown in FIG. 4, and the "Replay" state 404. The processes reaching to the "Replay" state (see, the step S306) in FIG. 5 are similar to those before reaching to the step S306 in FIG. 3.

In case of receiving the Ack command from the reader/writer apparatus 300 under such combination (step S307), when confirming that the "readout disenabling (ReadLock)" condition 402 or the "permanent readout disenabling (Permanent Readlock)" condition 403 is set up to the UII code bank 203 by referring to the readout enabling/disabling condition memory portion 105, then the protocol process controller portion 103, not responding the UII code, normally (step S501), but it transits the tag into the "Acknowledge" state (step S309). More detailed example of the operation, i.e., not responding the UII code, normally, will be mentioned later, by referring to FIG. 10.

Figure 6:
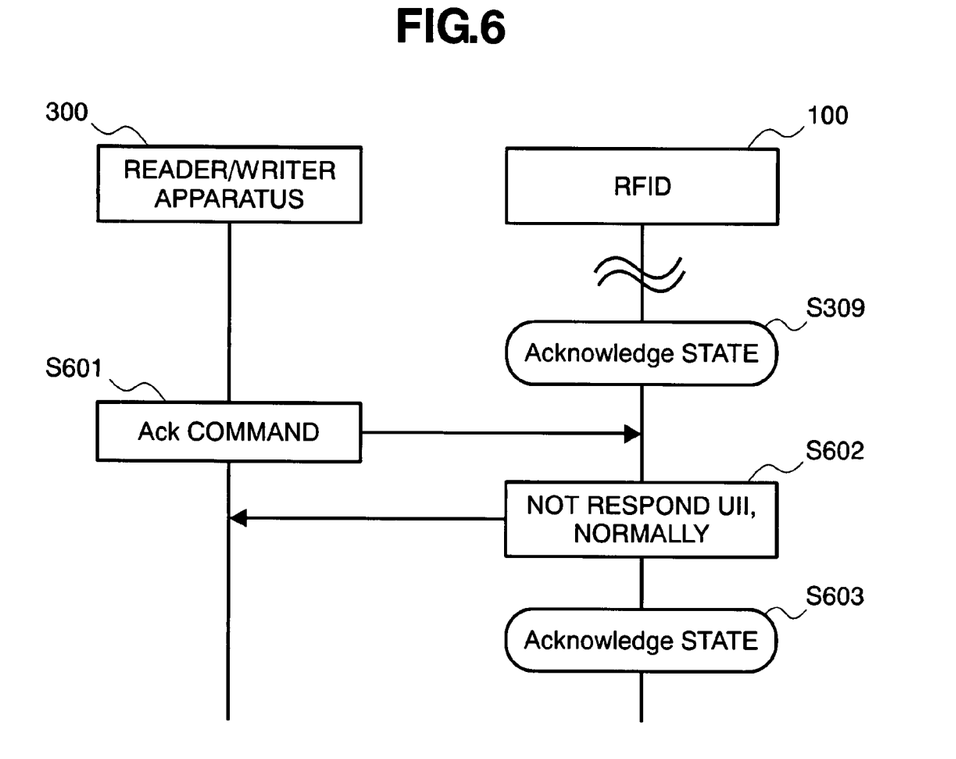
FIG. 6 is an operation flowchart of the RFID tag, according to the first embodiment, in particular, when combining "readout disenabling" or "permanent readout disenabling" condition of the UII code bank and "Acknowledge" state of the RFID tag.

FIG. 6 is a flowchart for showing the operation when combining the "readout disenabling (ReadLock)" condition 402 or the "permanent readout disenabling (Permanent Readlock)" condition 403, in relation to the UII code bank 203 shown in FIG. 4, and the "Acknowledge" state 405. The processes reaching to the "Acknowledge" state (see, the step S309) in FIG. 6 are similar to those before reaching to the step S309 in FIG. 3.

In case of receiving the Ack command from the reader/writer apparatus 300 under such combination (step S601), when confirming that the "readout disenabling (ReadLock)" condition 402 or the "permanent readout disenabling (Permanent Readlock)" condition 403 is set up to the UII code bank 203 by referring to the readout enabling/disabling condition memory portion 105, then the protocol process controller portion 103, not responding the UII code, normally (step S602), but it maintains the "Acknowledge" state (step S603). More detailed example of the operation, i.e., not responding the UII code, normally, will be mentioned later, by referring to FIG. 10.

Figure 7:
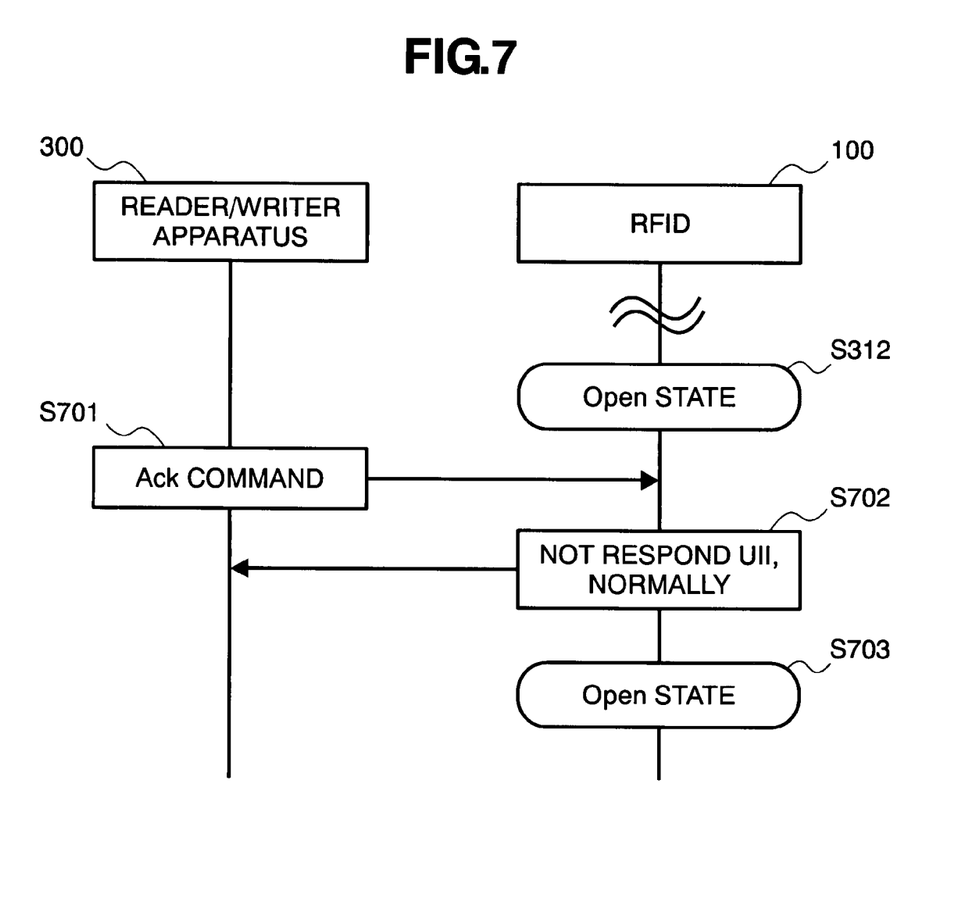
FIG. 7 is an operation flowchart of the RFID tag, according to the first embodiment, in particular, when combining "readout disenabling" or "permanent readout disenabling" condition of the UII code bank and "Open" state of the RFID tag.

FIG. 7 is a flowchart for showing the operation when combining the "readout disenabling (ReadLock)" condition 402 or the "permanent readout disenabling (Permanent Readlock)" condition 403, in relation to the UII code bank 203 shown in FIG. 4, and the "Open" state 406. The processes reaching to the "Open" state (see, the step S312) in FIG. 7 are similar to those before reaching to the step S312 in FIG. 3.

In case of receiving the Ack command from the reader/writer apparatus 300 under such combination (step S701), when confirming that the "readout disenabling (ReadLock)" condition 402 or the "permanent readout disenabling (Permanent Readlock)" condition 403 is set up to the UII code bank 203 by referring to the readout enabling/disabling condition memory portion 105, then the protocol process controller portion 103, not responding the UII code, normally (step S702), but it maintains the "Open" state (step S703). More detailed example of the operation, i.e., not responding the UII code, normally, will be mentioned later, by referring to FIG. 10.

Figure 8:
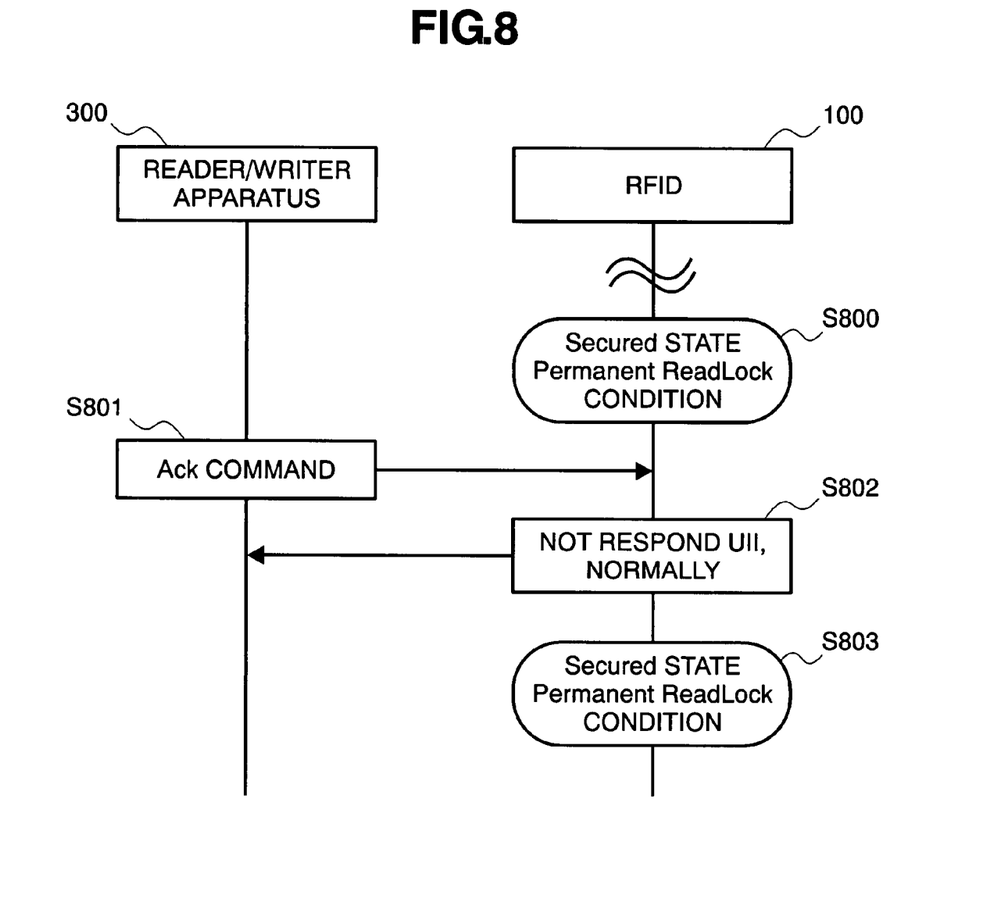
FIG. 8 is an operation flowchart of the RFID tag, according to the first embodiment, in particular, when combining "permanent readout disenabling" condition of the UII code bank and "Secured" state of the RFID tag.

FIG. 8 is a flowchart for showing the operation when combining the "permanent readout disenabling (Permanent Readlock)" condition 403 in relation to the UII code bank 203 shown in FIG. 4, and the "Secured" state 406. The processes reaching to the "Secured" state (see, the step S800) in FIG. 8 are similar to those before reaching to the step S315 in FIG. 3.

In case of receiving the Ack command from the reader/writer apparatus 300 under such combination (step S801), when confirming that the "permanent readout disenabling (Permanent Readlock)" condition 403 is set up to the UII code bank 203 by referring to the readout enabling/disabling condition memory portion 105, then the protocol process controller portion 103, not responding the UII code, normally (step S802), but it maintains the "Secured" state (step S803). More detailed example of the operation, i.e., not responding the UII code, normally, will be mentioned later, by referring to FIG. 10.

Figure 9:
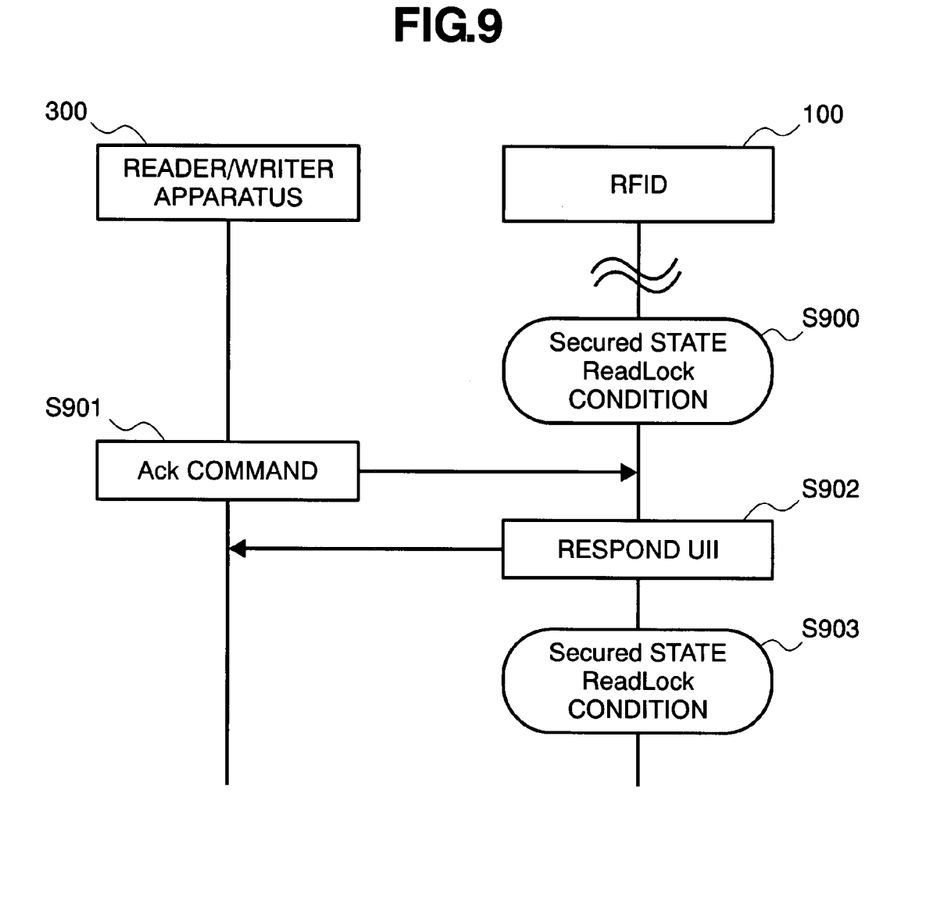
FIG. 9 is an operation flowchart of the RFID tag, according to the first embodiment, in particular, when combining "readout disenabling" condition of the UII code bank and "Secured" state of the RFID tag.
Figure 10:
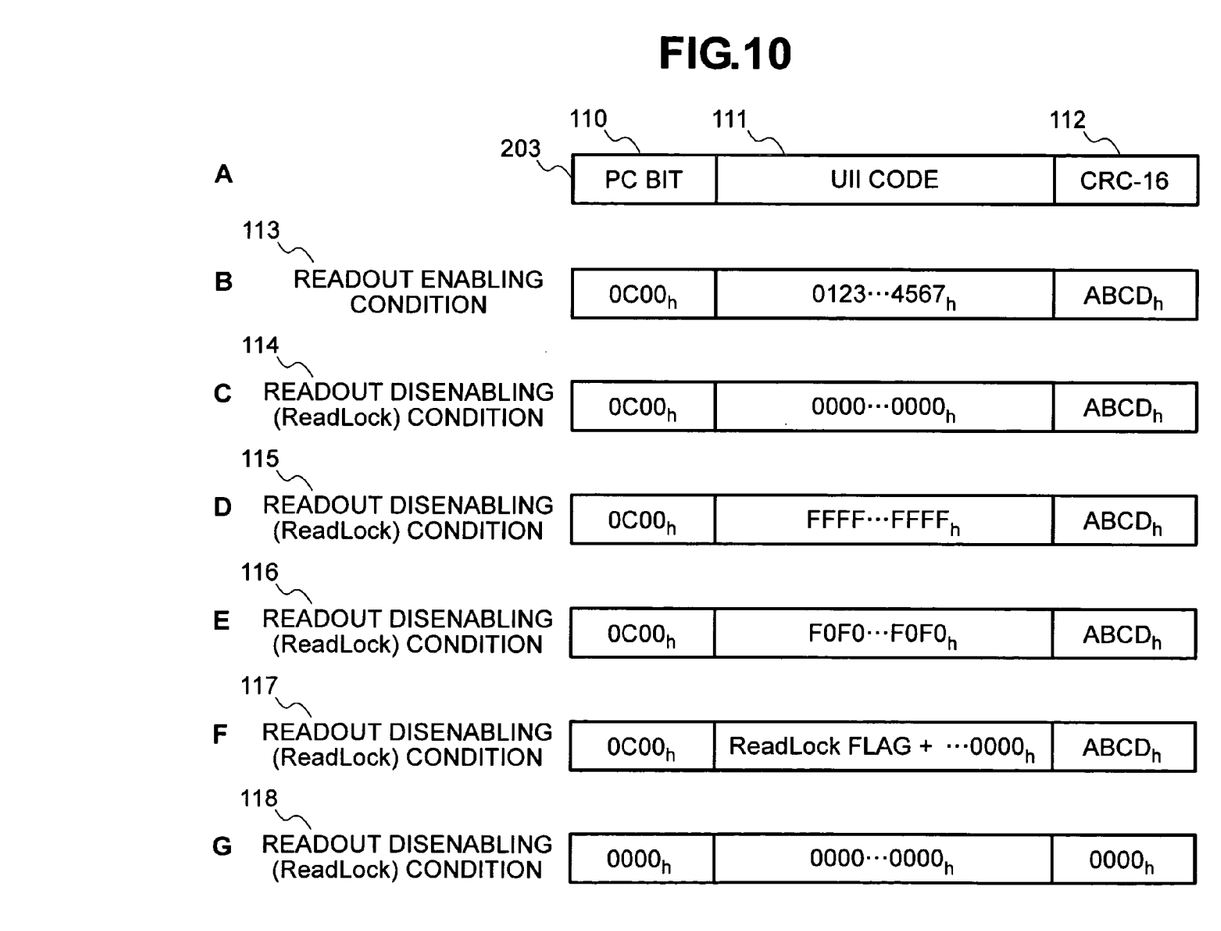
FIG. 10 is a view for showing example of answers, in particular, when the RFID tag, according to the first embodiment, does not respond the UII code, normally.

FIG. 9 is a flowchart for showing the operation when combining the "readout disenabling (Readlock)" condition 402 in relation to the UII code bank 203 shown in FIG. 4, and the "Secured" state 406. The processes reaching to the "Secured" state (see, the step S900) in FIG. 9 are similar to those before reaching to the step S315 in FIG. 3.

In case of receiving the Ack command from the reader/writer apparatus 300 under such combination (step S901), when confirming that the "readout disenabling (Permanent Readlock)" condition 402 is set up to the UII code bank 203 by referring to the readout enabling/disabling condition memory portion 105, then the protocol process controller portion 103 responds the UII code, normally (step S902), and maintains the "Secured" state (step S903).

In FIG. 10 will be shown the more detailed example of the operation, i.e., not responding the UII code, normally.

As is show by A in FIG. 10, the UII code bank 203 is constructed with PC bit 110, UII code 111, and CRC-16 data 112. The PC bit 110 means the Protocol-control (PC) bit, and it is regulated to include the information of length of the PC bit, etc. Also, the UII code 111 stores therein ID data unique to the FRID tag, and the longest length of storable codes therein depends on the specification of the FRID tag. For that reason, it is so determined that effective UII code length is defined within the PC bit 110. The CRC-16 data 112 is calculated in the protocol process controller portion 103, to be an error detection value, including the effective UII code, and that value is stored therein.

As is show by B in FIG. 10, in case when the "readout enabling" condition 113 is set up in the UII code bank 203, the protocol process controller portion 103 answers the normal data of the PC bit 110, the UII code 111 and the CRC-16 data 112, responding to the request or command from the reader/writer apparatus 300, as explained in the step S308 shown in FIG. 3.

On the other hand, when the "readout disenabling (ReadLock)" condition is set up in the UII code bank 203, the methods for responding the UII code can be made as below, for example.

As is show by C in FIG. 10, in the case when the "readout disenabling (ReadLock)" condition 114 is set up in the UII code bank 203, the protocol process controller portion 103 responds the normal values in relation to the PC bit 110 and the CRC-16 data 112, and it responds a fake UII code in relation to the UII code 111, by changing all data of the effective UII code length, which is designated in the PC bit, into "0x0".

Or alternately, as a variation thereof, as shown by D in FIG. 10, in case when the "readout disenabling (ReadLock)" condition 115 is set up in the UII code bank 203, the protocol process controller portion 103 may respond the normal values in relation to the PC bit 110 and the CRC-16 data 112, and it responds a fake UII code in relation to the UII code 111, by changing all data of the effective UII code length, which is designated in the PC bit, into "0xF".

Or in other variation thereof, as shown by E in FIG. 10, in case when the "readout disenabling (ReadLock)" condition 116 is set up in the UII code bank 203, the protocol process controller portion 103 may respond the normal values in relation to the PC bit 110 and the CRC-16 data 112, and it responds a fake UII code in relation to the UII code 111, by changing all data of the effective UII code length, which is designated in the PC bit, into a specific data pattern, such as, "0xF0F0 . . . ", for example.

Or, in further other variation thereof, as shown by F in FIG. 10, in case when the "readout disenabling (ReadLock)" condition 117 is set up in the UII code bank 203, the protocol process controller portion 103 may respond the normal values in relation to the PC bit 110 and the CRC-16 data 112, and it responds a fake UII code in relation to the UII code 111, by replacing data of the effective UII code length, which is designated in the PC bit, with the data combining the setup data (flag) of the "readout disenabling (ReadLock)" condition, being the data length below that, and data by changing all data corresponding to the remaining data length by a specific data pattern of "0x0", etc.

Or, in further other variation thereof, as shown by G in FIG. 10, in case when the "readout disenabling (ReadLock)" condition 118 is set up in the UII code bank 203, the protocol process controller portion 103 may respond a fake UII code, by changing data of either the PC bit 110 and the CRC-16 data 112, or the UII code 111, into the specific data pattern of "0x0", for example, corresponding to the data length thereof, respectively.

Or, alternately, as further other variation of the operation of not responding the UII code, normally, it is also possible to adapt an operation of responding a predetermined error code, but not shown in the figure, or no response, etc.

The operation mentioned above, i.e., not responding the UII code, normally, it can be applied, not only in the case when the "readout disenabling (ReadLock)" condition is set up, but also when the "readout disenabling (Permanent Readlock)" condition is set up.

In the case when applying the operation of responding the fake UII code of the data length same to that of the correct UII data, as shown by A-G in FIG. 10, as the operation of not responding the UII code, normally, since it seems for the reader/writer apparatus 300 that the UII code is responded, normally, in the step S308 shown in FIG. 3, therefore it is possible to bring the RFID tag 100 into the "Secured" state, for the reader/writer apparatus 300, by executing the protocols in accordance with the standard or regulation shown in FIG. 3. Therefore, even in the case of applying the conventional apparatus in accordance with the standard or regulation, as the reader/writer apparatus 300, it is possible, for the RFID tag 100, to achieve such advantages of being high in the security thereof.

As was explained in the above, the RFID tag according to the present embodiment, by setting up the "readout disenabling (ReadLock)" condition in the UII bank, it will not respond the UII code, normally, other than the "Secured" state, or by setting up the "permanent readout disenabling (Permanent ReadLock)" condition in the UII bank, it never respond the UII code, normally. For this reason, only for a user who knows the password of the RFID tag and therefore can bring the RFID tag into the "Secured" state, it is possible to read out the UII code, and therefore an improvement can be achieved in the property of security thereof.

Next, explanation will be made on the FRID tag, according to a second embodiment of the present invention, by referring to FIGS. 11 and 12 attached herewith.

Figure 11:
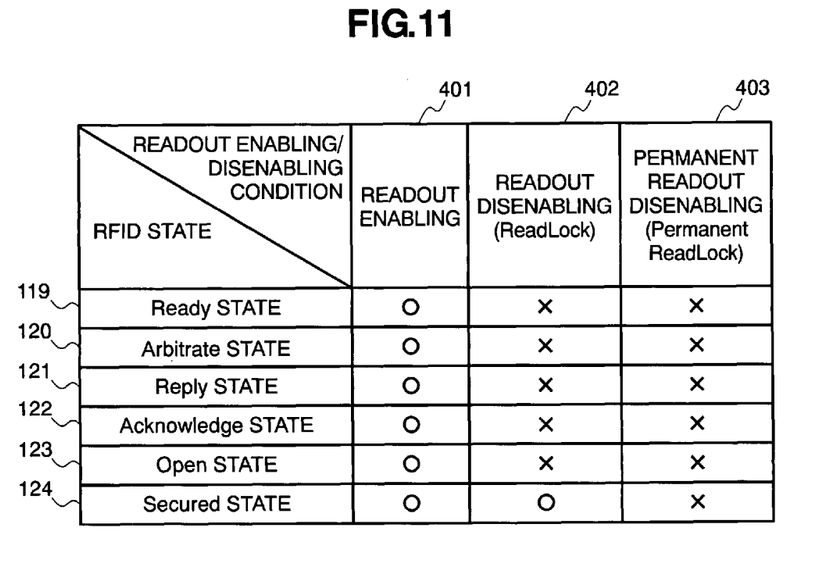
FIG. 11 is a table for showing states of the RFID tag and different operations, corresponding to combinations with enabling/disabling condition for readout of the memory bank, to which the select condition relates, according to a second embodiment.

FIG. 11 is a table for showing a relationship between the readout enabling/disenabling conditions to the memory banks building up the memory portion 104 of the RFID tag 100, according to the present embodiment, and responses thereto; i.e., whether the RFID tag should normally respond the UII code ("○" in the figure) or not ("X" in the figure), responding to the Select command from the external communication apparatus 106, such as, the reader/writer apparatus, etc., depending on the combination with the transmittable state of the RFID tag (i.e., the RFID state). In FIG. 11, it is presumed that the Select command designates the Select condition in relation to the memory banks where the readout enabling/disenabling conditions thereof are already set up. FIG. 12 is a flowchart for showing the operations of the RFID tag 100, in case when the RFID tag 100 receives the Select command from the reader/writer apparatus 300.

As is shown in FIG. 11, in case where the "readout enabling" condition 401 is set up in the memory bank, to which the Select condition of the Select command relates (i.e., the memory bank, the attribute of which is designated, in relation to the memory bank), when the FRID tag 100 receives the Select command, the protocol process controller portion 103 confirms that the "readout enabling" condition is set up in the memory bank thereof by referring to the readout enabling/disabling condition memory portion 105, and thereby conducting the normal operation responding to the Selection command, where the RFID tag 100 is in any state thereof; i.e., "Ready" state 119, "Attribute" state 120, "Replay" state 121, "Acknowledged" state 122, "Open" state 123, or "Secured" state 124.

Also, in case where the "readout disenabling (ReadLock)" condition 402 is set up in the memory bank, to which the Select condition of the Select command relates, and the RFID tag state is in the "Secured" state 124, the protocol process controller portion 103 conducts the normal operation responding to the Selection command, in the similar manner thereof. The detailed flows thereof are similar to those, which are explained about the steps S302 and S303 in FIG. 3.

On the other hand, as is shown in FIG. 11, in case where the "readout disenabling (ReadLock)" condition 402 or the "permanent readout disenabling (Permanent ReadLock)" condition 403 is set up in the memory bank, to which the Select condition of the Select command relates, and the RFID tag 100 is in any one of the states, i.e., the "Ready" state 119, the "Attribute" state 120, the "Replay" state 121, "Acknowledged" state 122, and "Open" state 123, then the protocol process controller portion 103 does not conduct the normal operation responding to the Selection command, when the FRID tag 100 receives the Select command. Also, in case where the "permanent readout disenabling (Permanent ReadLock)" condition 403 is set up in the memory bank, to which the Select condition of the Select command relates, even the RFID tag is in the "Secured" state 124, the protocol process controller portion 103 does not operate, normally, responding to the Select command.

Figure 12:
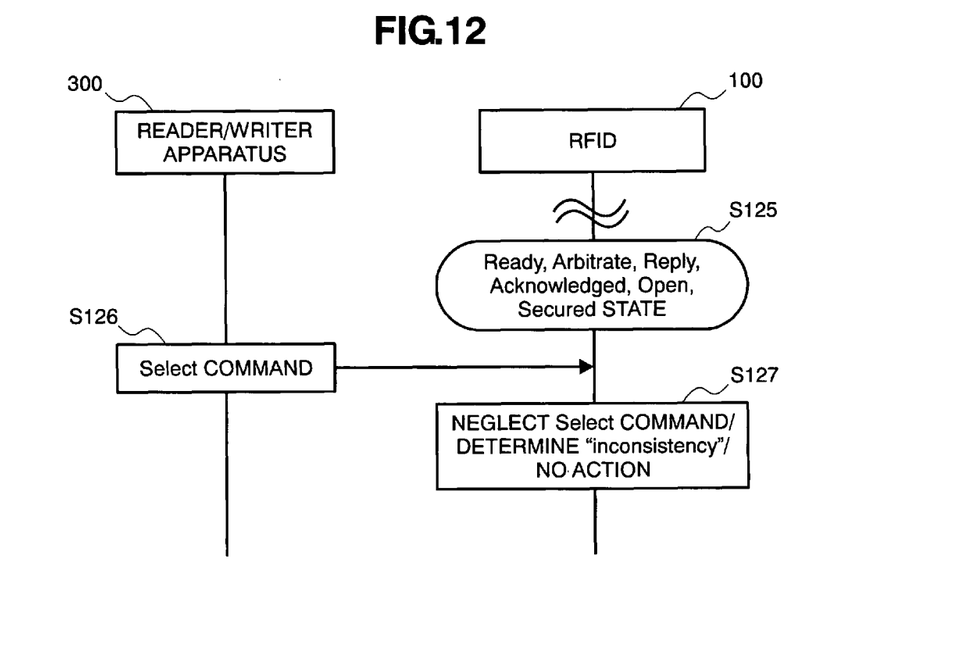
FIG. 12 is an operation flowchart of the RFID tag, according to the second embodiment.

In more details thereof, as is shown in FIG. 12, when the RFID tag 100 is in any one of the states mentioned above (step S125), the Select command is transmitted from the reader/writer apparatus 300 (step S125). Then, the protocol process controller portion 103 checks the readout enabling/disenabling condition set up in the memory bank, to which the Select condition of the Select command relates, by referring to the readout enabling/disabling condition memory portion 105. As a result thereof, if it is confirmed that the "readout disenabling (ReadLock)" condition or the "permanent readout disenabling (Permanent ReadLock)" condition is set up, then the protocol process controller portion 103 does not operate, normally, by a way of doing; i.e., neglecting the Select command, or determining "inconsistency" to the Selection condition of the Selection command, or not executing the action requested by the Select command, for example.

As was fully mentioned in the above, the RFID tag according to the present embodiment, does not operate, normally, responding to the Select command, in the case where the "readout disenabling (ReadLock)" condition or the "permanent readout disenabling (Permanent ReadLock)" condition is set up in the memory bank, to which the Select condition of the Select command relates; therefore, there is no chance that the data in the memory banks is read out, unconditionally, but only the user who knows the password can read out the data thereof, and thereby improving the property of security thereof.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims. For example, the present invention may be applied into wireless IC memories other than the RFID tag.

What is claimed is:

1. A wireless IC memory, for transmitting command or data between an external communication apparatus, with using radio-wave communication, comprising:
   an antenna, which is configured to transmit radio-waves carrying a signal with said external communication apparatus;
   a communication processor portion, which is configured to conduct transmission control of said signal;
   one or more memory banks, which are configured to memorize data therein, including an ID bank, a user area bank, a tag-code bank and a security bank, and which are configured to memorize UII code, which is ID data of being unique to said wireless IC memory;
   a protocol processing controller portion, which is configured to conduct transmission process of command or data that said signal presents, management of states of said wireless IC memory on protocol, or control of data readout for each of said memory banks; and
   a condition memory portion, including, at least, said ID data bank, which is configured to set up an enabling/ disenabling condition of data readout of said ID data bank for each memory bank, wherein said protocol processing controller portion has:

a condition setup portion, which is configured to set up one condition, being selected from at least first and second conditions, in said condition memory portion, as the enabling/disenabling condition of data readout of said ID data bank; and an access control portion, which is configured to respond said ID data, normally, to a readout command of said ID data from said external communication apparatus, when said first condition is set up in said condition memory portion, but not respond said ID data, normally, to the readout command of said ID data from said external communication apparatus, when said second condition is set up in said condition memory portion.

2. A wireless IC memory, for transmitting command or data between an external communication apparatus, with using radio-wave communication, comprising:

an antenna, which is configured to transmit radio-waves carrying a signal with said external communication apparatus;

a communication processor portion, which is configured to conduct transmission control of said signal;

one or more memory banks, which are configured to memorize data therein, including an ID bank, a user area bank, a tag-code bank and a security bank, and which are configured to memorize UII code, which is ID data unique to said wireless IC memory;

a protocol processing controller portion, which is configured to conduct transmission process of command or data that said signal presents, management of states of said wireless IC memory on protocol, or control of data readout for each of said memory banks; and a condition memory portion, including, at least, said ID data bank, which is configured to set up an enabling/disenabling condition of data readout of said ID data bank for each memory bank, wherein said protocol processing controller portion has:

a condition setup portion, which is configured to set up one condition, being selected from at least first and second conditions, in said condition memory portion, as the readout enabling/disenabling condition of data of said ID data bank;

an access control portion, which is configured to respond said ID data, normally, to a readout command of said ID data from said external communication apparatus, when said first condition is set up in said condition memory portion, but not respond said ID data, normally, to the readout command of said ID data from said external communication apparatus, when said second condition is set up in said condition memory portion; and a state management portion, which is configured to transit the state of said wireless IC memory on the protocol, among a predetermined number of states, wherein said access control portion conducts a response, differently, to the readout command of said ID data from said external communication apparatus, depending upon combination between the readout enabling/disenabling condition in relation to said ID data bank, which is set up in said readout condition setup portion, and the state of said wireless IC memory on the protocol.

3. A wireless IC memory, for transmitting command or data between an external communication apparatus, with using radio-wave communication, comprising:

an antenna, which is configured to transmit radio-waves carrying a signal with said external communication apparatus;

a communication processor portion, which is configured to conduct transmission control of said signal;

one or more memory banks, which are configured to memorize data therein, including an ID bank, a user area bank, a tag-code bank and a security bank, and which are configured to memorize UII code, which is ID data unique to said wireless IC memory;

a protocol processing controller portion, which is configured to conduct transmission process of command or data that said signal presents, management of states of said wireless IC memory on protocol, or control of data readout for each of said memory banks; and a condition memory portion, including, at least, said ID data bank, which is configured to set up an enabling/disenabling condition of data readout of said ID data bank for each memory bank, wherein said protocol processing controller portion has:

a condition setup portion, which is configured to set up one condition, being selected from at least first and second conditions, in said condition memory portion, as the readout enabling/disenabling condition of data of said ID data bank;

an access control portion, which is configured to conduct a response, differently, to the readout command of said ID data from said external communication apparatus, depending upon combination between the readout enabling/disenabling condition in relation to said ID data bank, which is set up in said readout condition setup portion, and the state of said wireless IC memory on the protocol; and a state management portion, which is configured to transit the state of said wireless IC memory on the protocol, among a predetermined number of states, wherein said condition setup portion sets up one condition, which is selected among first, second and third conditions, as said readout enabling/disenabling condition in relation to said ID data bank, said state management portion transits the state of said wireless IC memory on the protocol, sequentially, in an order of "Replay" state, "Acknowledge" state, "Open" state and "Secured" state, respectively, and said access control portion responds said ID data, normally, to the readout command of said ID data from said external communication apparatus, in case where said first condition is set up in said condition memory portion, irrespective of any one of the states of said wireless IC memory on the protocol, said access control portion, though responding said ID data, normally, to the readout command of said ID data from said external communication apparatus, only when the state of said wireless IC memory on the protocol is the "Secured" state, but does not respond, normally, when it is the state other than said "Secured" state, in case where said second condition is set up in said condition memory portion, and further, said access control portion does not respond, normally, to the readout command of said ID data from said external communication apparatus, irrespective of any one of the states of said wireless IC memory on the protocol, in case where said third condition is set up in said condition memory portion.

4. The wireless IC memory, as is described in the claim 3, wherein said access control portion responds a fake ID data, normally, which is same in data length to said ID data but different in data values thereof, as an action of not responding said ID data.

5. The wireless IC memory, as is described in the claim 4, wherein said access control portion responds said fake ID data, normally, which replaces data of whole data length of said ID data by "0", as the action of not responding said ID data.

6. The wireless IC memory, as is described in the claim 4, wherein said access control portion responds said fake ID data, normally, which replaces data of whole data length of said ID data by data of a specific pattern predetermined, as the action of not responding said ID data.

7. The wireless IC memory, as is described in the claim 4, wherein said access control portion responds said fake ID data, normally, combining data indicative of said second condition or said third condition, and data of a specific pattern predetermined, as the action of not responding said ID data.

8. The wireless IC memory, as is described in the claim 4, wherein:
said ID data bank also stores a protocol control bit and an error detection value, together with said ID data, therein, and
said access control portion responds a fake protocol control bit and a fake error detection value, as well as, said fake ID data, as the action of not responding said ID data, normally.

9. The wireless IC memory, as is described in the claim 3, wherein said access control portion responds a predetermined error code or makes no response, as an action of not responding said ID data, normally.

10. A wireless IC memory, for transmitting command or data between an external communication apparatus, with using radio-wave communication, comprising:
an antenna, which is configured to transmit radio-waves carrying a signal with said external communication apparatus;
a communication processor portion, which is configured to conduct transmission control of said signal;
one or more memory banks, which are configured to memorize data therein, including an ID bank, a user area bank, a tag-code bank and a security bank, and which are configured to memorize a UII code, which is ID data unique to said wireless IC memory;
a protocol processing controller portion, which is configured to conduct transmission process of command or data that said signal presents, management of states of said wireless IC memory on protocol, or control of data readout for each of said memory banks; and
a condition memory portion, including, at least, said ID data bank, which is configured to set up an enabling/disenabling condition of data readout of said ID data bank for each memory bank, wherein
said protocol processing controller portion has:
a condition setup portion, which is configured to set up one condition, being selected from at least first and second conditions, in said condition memory portion, as the enabling/disenabling condition of data readout of said ID data bank; and
an access control portion, which is configured to execute an action requested by said selection command, normally, where said first condition is set up in said condition memory portion, about the memory banks in relation to said selection condition, but neglects said selection command, or determines inconsistency with said selection condition, or not execute the action requested by said selection command, where said second condition is set up in said condition memory portion, about the memory banks in relation to said selection condition, in case when receiving the selection command having a selection condition in relation to any of the memory banks, from said external communication apparatus.

11. The wireless IC memory, as is described in the claim 10, wherein:
said condition setup portion sets up one condition, which is selected among first, second and third conditions, as said readout enabling/disenabling condition in relation to said ID data bank,
said state management portion transits the state of said wireless IC memory on the protocol, sequentially, in an order of "Replay" state, "Acknowledge" state, "Open" state and "Secured" state, respectively, and
said access control portion executes the action, normally, which is requested by said selection, in case where said first condition is set up in said condition memory portion, irrespective of any one of the states of said wireless IC memory on the protocol, only when the state of said wireless IC memory on the protocol is the "Secured" state,
said access control portion, though executing the action, normally, which is requested by said selection, only when the state of said wireless IC memory on the protocol is the "Secured" state, but does not execute the action, normally, which is requested by said selection, when it is the state other than said "Secured" state, in case where said second condition is setup in said condition memory portion, and further,
said access control portion does not execute the action, normally, which is requested by said selection, irrespective of any one of the states of said wireless IC memory on the protocol, in case where said third condition is set up in said condition memory portion.

12. A wireless IC memory accessing apparatus, which is configured to control the wireless IC memory as described in the claim 1.

13. A wireless IC memory accessing apparatus, which is configured to control the wireless IC memory as described in the claim 2.

14. A wireless IC memory accessing apparatus, which is configured to control such wireless IC memory as described in the claim 3.

15. An accessing control method for use of the wireless IC memory, which is configured to control such wireless IC memory as described in the claim 1.

16. An accessing control method for use of the wireless IC memory, which is configured to control such wireless IC memory as described in the claim 2.

17. An accessing control method for use of the wireless IC memory, which is configured to control such wireless IC memory as described in the claim 3.

18. A wireless IC memory system including such wireless IC memory as described in the claim 1, and a wireless IC memory accessing apparatus, which is configured to control said wireless IC memory.

19. A wireless IC memory system including such wireless IC memory as described in the claim 2, and a wireless IC memory accessing apparatus, which is configured to control said wireless IC memory.

20. A wireless IC memory system including such wireless IC memory as described in the claim 3, and a wireless IC memory accessing apparatus, which is configured to control said wireless IC memory.

* * * * *